(12) United States Patent
Benitez

(10) Patent No.: US 10,098,504 B2
(45) Date of Patent: Oct. 16, 2018

(54) TORTILLA TOASTER

(71) Applicant: Elliot Benitez, Chicago, IL (US)

(72) Inventor: Elliot Benitez, Chicago, IL (US)

( * ) Notice: Subject to any disclaimer, the term of this patent is extended or adjusted under 35 U.S.C. 154(b) by 0 days.

(21) Appl. No.: 14/773,753

(22) PCT Filed: Mar. 14, 2014

(86) PCT No.: PCT/US2014/029236
§ 371 (c)(1),
(2) Date: Sep. 8, 2015

(87) PCT Pub. No.: WO2014/153134
PCT Pub. Date: Sep. 25, 2014

(65) Prior Publication Data
US 2016/0045069 A1    Feb. 18, 2016

Related U.S. Application Data

(60) Provisional application No. 61/785,976, filed on Mar. 14, 2013.

(51) Int. Cl.
*A47J 37/08* (2006.01)
*A21D 13/42* (2017.01)
*A23L 5/10* (2016.01)

(52) U.S. Cl.
CPC .............. *A47J 37/08* (2013.01); *A21D 13/42* (2017.01); *A23L 5/15* (2016.08); *A47J 37/0807* (2013.01); *A47J 37/0842* (2013.01)

(58) Field of Classification Search
CPC ........ A47J 37/08–37/0892; A23L 5/15; A21D 13/42–13/43

USPC .............................. 99/327, 329 RT, 385–402
See application file for complete search history.

(56) References Cited

U.S. PATENT DOCUMENTS

| | | | | |
|---|---|---|---|---|
| 1,212,051 | A * | 1/1917 | Gumaer | A47J 37/08 235/59 BC |
| 1,471,275 | A * | 10/1923 | Moneuse | A47J 37/0857 414/567 |
| 1,551,336 | A * | 8/1925 | Shroyer | A47J 37/08 99/391 |
| 1,680,768 | A * | 8/1928 | Dalton | A47J 37/08 99/398 |
| 1,682,683 | A * | 8/1928 | Parodi | A47J 37/0828 200/35 H |
| 1,697,914 | A * | 1/1929 | Hummel | A47J 37/0821 99/327 |
| 1,717,979 | A * | 6/1929 | Hummel | A47J 37/08 99/327 |

(Continued)

OTHER PUBLICATIONS

Sharp. Crostino Twists Your Toast—Avoids Burnt Fingers. Gadgets and Gizmos. Mar. 6, 2012. [retrieved on Jul. 15, 2014]. Retrieved from internet: <URL: http:www.gadgetsandgizmos.org/crostino-twists-your-toast-avoids-burnt-fingers/>.

(Continued)

*Primary Examiner* — Drew E Becker
(74) *Attorney, Agent, or Firm* — James Michael Faier; Faier & Faier P.C.

(57) ABSTRACT

An improved tortilla toaster that batch heats on two sides simultaneously up to six tortillas where each tortilla is held an optimal distance away from heating source and the oven is unloaded by barrel-rolling the oven assembly so as to avail of gravity and tortilla shape to unload the oven.

22 Claims, 20 Drawing Sheets

(56) References Cited

U.S. PATENT DOCUMENTS

| | | | | |
|---|---|---|---|---|
| 1,747,239 | A * | 2/1930 | Hauck | A23L 7/187 |
| | | | | 34/126 |
| 2,114,000 | A * | 4/1938 | Vidaver | A47J 37/0814 |
| | | | | 200/85 R |
| 2,167,121 | A * | 7/1939 | McCreary | A47J 37/0814 |
| | | | | 99/329 R |
| 2,197,221 | A * | 4/1940 | Koci | A47J 37/0814 |
| | | | | 340/640 |
| 2,270,327 | A * | 1/1942 | Mills | A47J 27/16 |
| | | | | 126/349 |
| 2,387,817 | A * | 10/1945 | Wales | A47J 37/0814 |
| | | | | 99/327 |
| 2,414,081 | A * | 1/1947 | Barclay | A47J 37/085 |
| | | | | 327/393 |
| 2,523,641 | A * | 9/1950 | Alvarez | A47J 37/0709 |
| | | | | 126/30 |
| 2,559,444 | A * | 7/1951 | Locke | A47J 29/04 |
| | | | | 200/35 R |
| 2,562,535 | A * | 7/1951 | Hamlin | A47J 37/0814 |
| | | | | 307/132 T |
| 2,582,760 | A * | 1/1952 | Schoonmaker | A47J 37/0857 |
| | | | | 99/327 |
| 2,693,141 | A | 11/1954 | Johnson et al. | |
| 2,788,427 | A * | 4/1957 | Fresone | A47J 37/0611 |
| | | | | 219/483 |
| 2,907,267 | A * | 10/1959 | Lindsey | A47J 37/04 |
| | | | | 126/25 AA |
| 3,092,014 | A * | 6/1963 | Macchi | A21B 5/03 |
| | | | | 99/423 |
| 3,421,432 | A * | 1/1969 | Giepen | A47J 37/04 |
| | | | | 219/392 |
| 3,645,196 | A * | 2/1972 | Johnston | A47J 37/1214 |
| | | | | 99/404 |
| 3,859,903 | A * | 1/1975 | Kipp | A47J 37/0878 |
| | | | | 99/391 |
| 4,745,855 | A | 5/1988 | Younger | |
| 4,976,195 | A * | 12/1990 | Cavazos | A47J 37/08 |
| | | | | 99/390 |
| 5,309,826 | A | 5/1994 | Ortiz | |
| 5,584,231 | A * | 12/1996 | DeLeon | A47J 37/08 |
| | | | | 219/492 |
| 5,765,471 | A * | 6/1998 | Monard | A47J 39/00 |
| | | | | 219/386 |
| 6,062,128 | A * | 5/2000 | Borgward | A47J 37/0857 |
| | | | | 99/326 |
| 6,116,150 | A | 9/2000 | Greenfield | |
| 6,192,790 | B1 * | 2/2001 | Balandier | A47J 37/0807 |
| | | | | 219/521 |
| 6,205,911 | B1 | 3/2001 | Ochoa | |
| 6,546,844 | B1 | 4/2003 | Trevino | |
| 6,811,802 | B2 * | 11/2004 | van Esbroeck | A21C 11/00 |
| | | | | 426/389 |
| 6,979,803 | B1 * | 12/2005 | Webb | A47J 37/0807 |
| | | | | 219/386 |
| 7,047,871 | B1 * | 5/2006 | Christoffel | A47J 37/0871 |
| | | | | 99/327 |
| 7,094,991 | B2 * | 8/2006 | Naranjo | A47J 37/08 |
| | | | | 219/385 |
| 8,069,776 | B2 | 12/2011 | Glucksman | |
| 8,759,720 | B2 * | 6/2014 | Gonzalez | A47J 36/2483 |
| | | | | 219/388 |
| 9,516,883 | B1 * | 12/2016 | Huegerich | A21B 3/07 |
| 2002/0152898 | A1 * | 10/2002 | DuBois | A47J 37/0857 |
| | | | | 99/349 |
| 2005/0204927 | A1 * | 9/2005 | Boyle | A47J 37/0857 |
| | | | | 99/389 |
| 2008/0282903 | A1 * | 11/2008 | Gonzalez | A47J 37/0857 |
| | | | | 99/334 |
| 2009/0293737 | A1 * | 12/2009 | Davis | A47J 37/0885 |
| | | | | 99/394 |
| 2011/0067578 | A1 * | 3/2011 | Volatier | A47J 37/0814 |
| | | | | 99/385 |
| 2015/0114237 | A1 * | 4/2015 | Abukashef | A47J 37/08 |
| | | | | 99/393 |
| 2017/0035246 | A1 * | 2/2017 | Roostaie | A47J 37/0885 |
| 2017/0303742 | A1 * | 10/2017 | Gallego, II | A47J 37/0871 |

OTHER PUBLICATIONS

Choe. Toastone tilting toaster concept. Jul. 10, 2006. [retrieved on Jul. 15, 2014]. Retrieved from internet: <URL: http:www.core77.com/blog/object_culture/toastone_tilting_toaster_concept_4017:asp>.

* cited by examiner

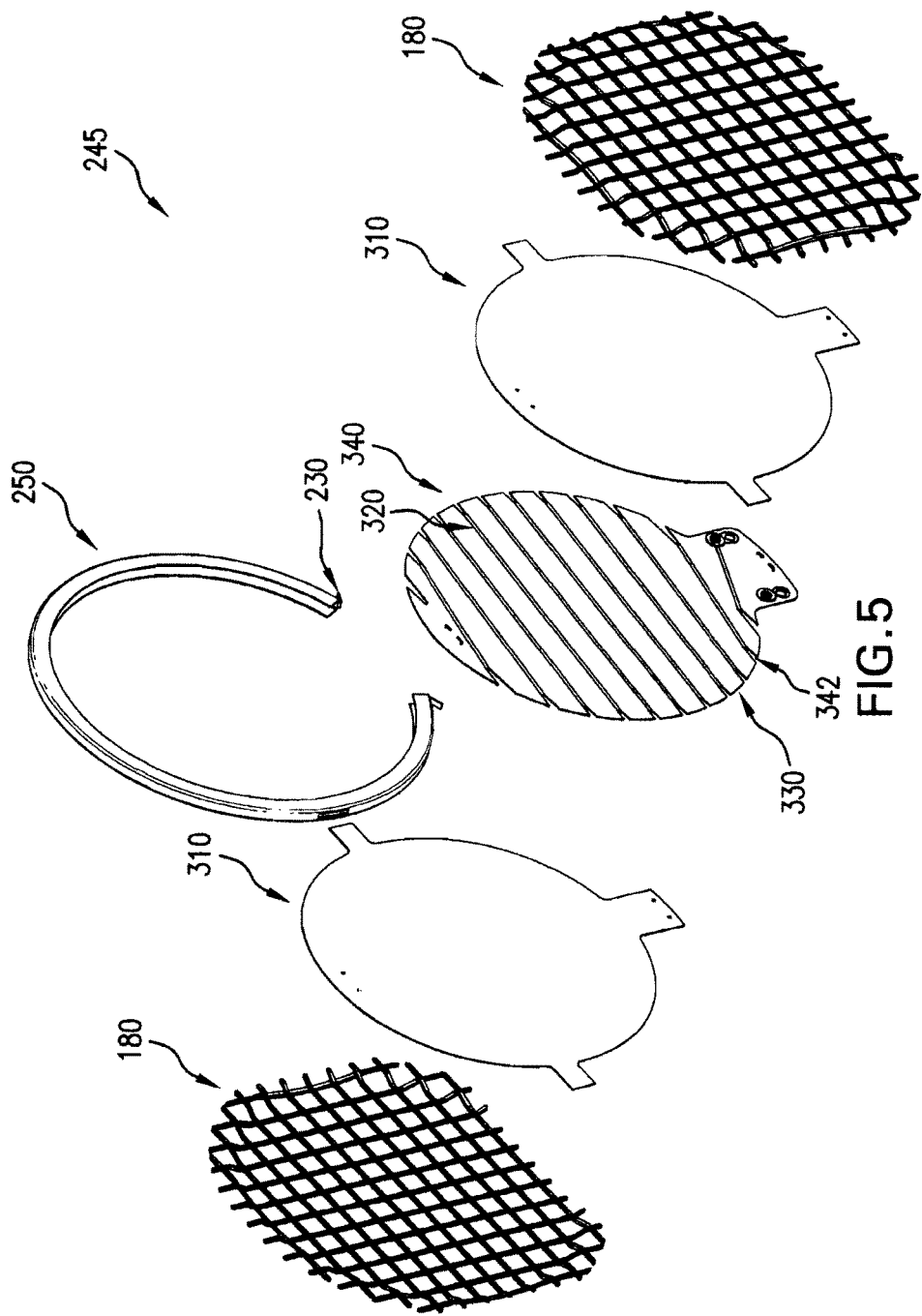

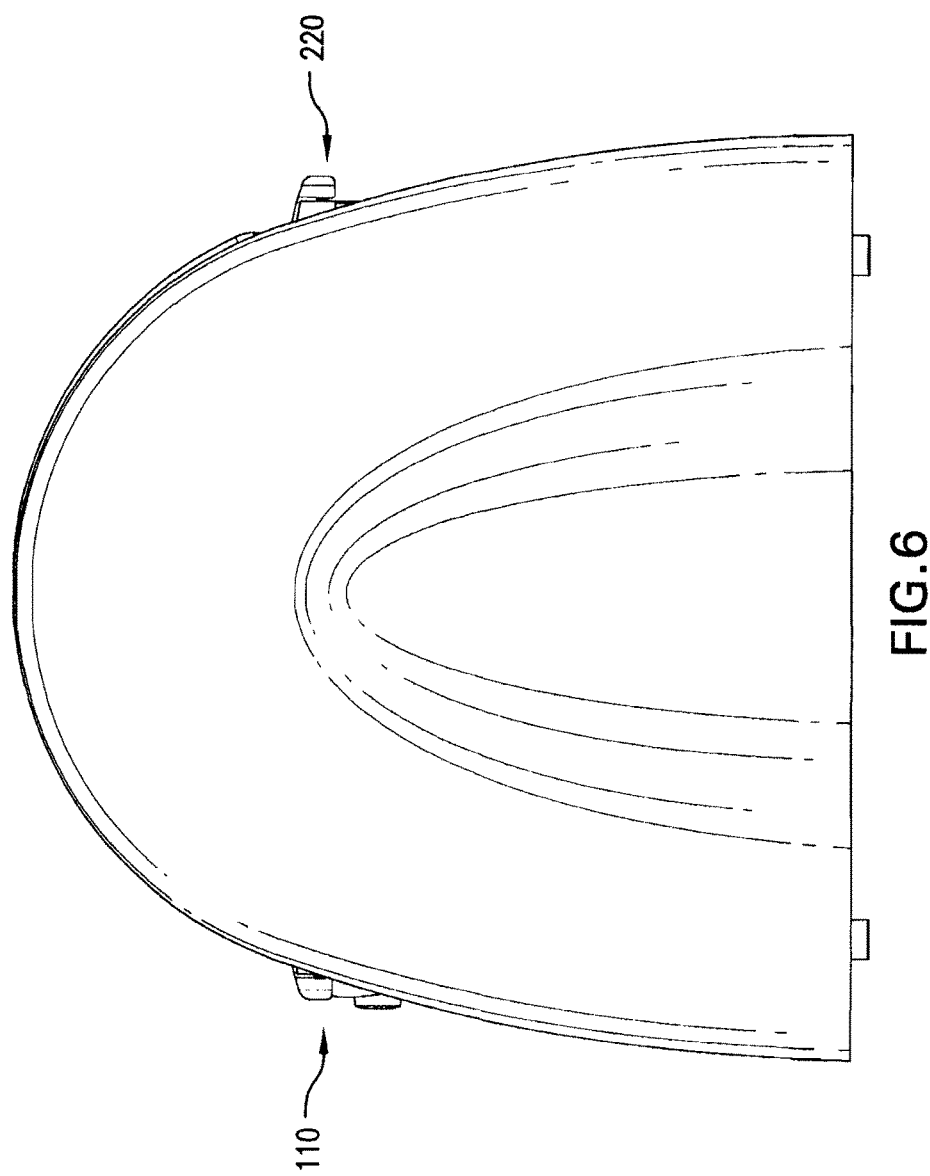

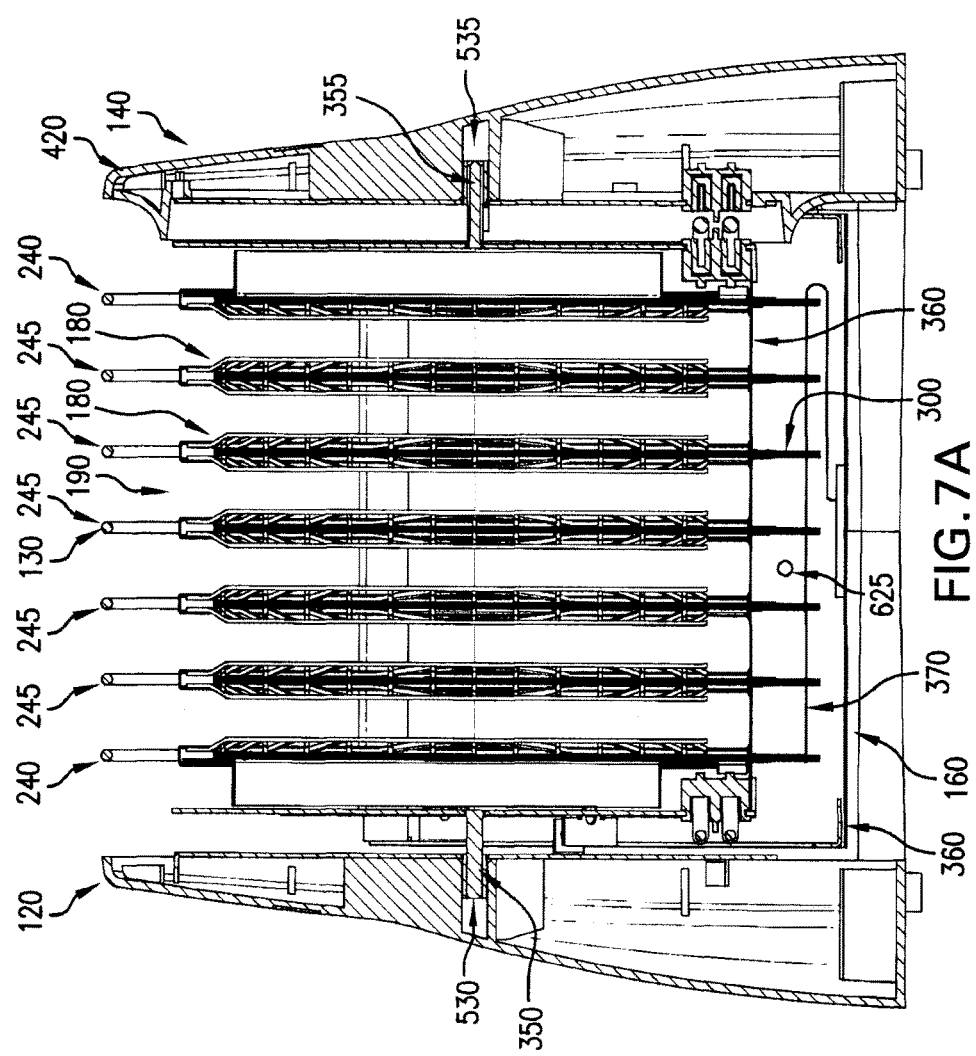

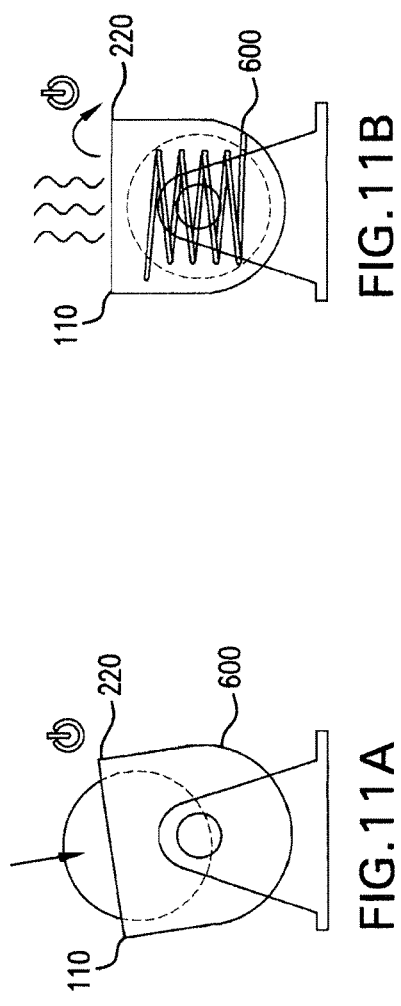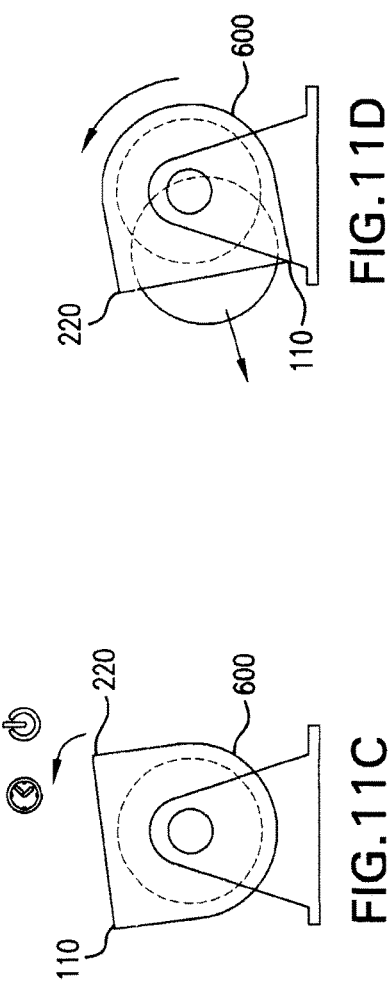

TORTILLA TOASTER

This non-provisional application draws priority International Application Number PCT/US2014/029236 dated Mar. 14, 2014 that drew priority from U.S. Provisional Application Ser. No. 61/785,976 filed on Mar. 14, 2013.

BACKGROUND OF THE INVENTION

The tortilla is a basic food in Hispanic homes in the United States and around the world. Typically made of corn or flour, the tortilla is served warm at every meal. Typically in the United States a tortilla is flat, round and six-inches in diameter. Conventionally, a tortilla is heated in a skillet on each side. Heating in a skillet, the surface of the tortilla in contact with the skillet is toasted and it acquires a bit of a skin. The tortilla is typically then flipped and the other side of the flat tortilla is warmed and it too acquires a bit of a skin. Typically, a family eats six to twelve tortillas at a meal.

Warming enough tortillas for a meal presents a problem. The skillet warming method requires a minimum of one minute per side. Only four tortillas can be warmed in a typical skillet. Some persons tasked with warming tortillas have tried to use the microwave oven to warm the tortilla but microwave cooking does not result in the desired consistency as the tortillas become too moist. Moreover, in the microwave a tortilla is warmed from the inside out. In the skillet, a tortilla is toasted from the outside with heat permeating the interior.

Inventor found a number of patents on devices to warm tortillas. Inventor reviewed the following patents:
U.S. Pat. No. 7,047,871 to Christoffel
U.S. Pat. No. 8,069,776 to Glucksman
U.S. Pat. No. 6,546,844 to Trevino
U.S. Pat. No. 5,584,231 to DeLeon
U.S. Pat. No. 2,562,535 to Leonard
U.S. Pat. No. 6,205,911 to Ochoa
U.S. Pat. No. 5,765,471 to Monard
U.S. Pat. No. 4,976,195 to Cavazos
U.S. Pat. No. 7,094,991 to Naranjo
U.S. Pat. No. 6,116,150 to Greenfield
U.S. Pat. No. 5,309,826 to Ortiz
None of these patents respond to problems in the inventive manner addressed by inventor.

SUMMARY OF THE INVENTION

The invention is an improved tortilla toaster able to be stationed on a tabletop and able to heat six standard six-inch tortillas in about 90-seconds and, with a barrel or drum pivot of the heating area, deliver the warm, toasted tortillas onto a plate or tray without risking a burn to the hands of the user. The improved tortilla toaster also reduces risks of shock or electrocution because, unlike a bread toaster with exposed electric wires where a person wielding a utensil might stick said utensil in a toaster and make contact with the electric wires, the improved tortilla toaster has no exposed electric wires. As discussed below, heat is provided by Nichrome wires wrapped around a mica board and that mica board is sandwiched between two other mica boards devoid of electric wires.

As shown in the accompanying drawings, the improved tortilla toaster is able to accept up to six six-inch corn or flour tortillas. The improved tortilla toaster has a base with a left end cap and a right end cap. There is drum-shaped or half-barrel-shaped outer oven wall with a left pivot pin and a right pivot pin. The left pivot pin rests in a socket in the interior of the leg of the left end cap. The right pivot pin rests in a socket in the interior of the leg of the right end cap. Inside the outer oven is a drum-shaped or half-barrel-shaped inner oven wall. Mounted in the inner oven wall are seven heating modules. On the extreme left and right sides is a thermal brake to prevent heat melting either end cap. In the preferred embodiment, the end caps could be made of metal or plastic. For reasons of cost, the end caps would likely be formed of molded plastic. Each heating module is comprised of a mica heating plate wrapped with Nichrome wire with a mica thermal diffuser on either side of said heating plate with a steel cage guard on either side of said mica thermal diffuser and an assembly retainer that holds the above identified pieces together. All internal parts of the improved tortilla toaster are food grade products. The cage guards are food grade steel or stainless steel. AC power is from the wall (or any AC source of similar character to typical home AC power) and the cord enters the device in the base of the device. The cord connects in the right end cap to the DPST ("double pole single throw") Contact installed on the right side outer enclosure plate. When the tortilla toaster is set so that the front and back sills are approximately parallel to the ground, then the DPST Contact on the right side outer enclosure plate makes contact with the DPST Contact mounted on thermal brake. AC Power is then distributed from the DPST Contact on the thermal brake to wires that carry power to the control board and the heating modules.

A user may adjust a knob connected to a variable resister or potentiometer on the control board through the outer oven enclosure to adjust the time of the heating and toasting of the tortilla toaster cycle. The forward and rearward edge of the half-barrel or drum is fitted with a combination manual rotation lever and switch.

The improved tortilla toaster would typically be set on a counter or table or shelf or dashboard or seat approximately parallel to the ground. When the improved tortilla toaster is in use, then the forward and rearward combination manual rotation lever and switch are approximately parallel to the table top. When the improved tortilla toaster is not in service, then the forward combination manual rotation lever and switch is lower than the rearward combination manual rotation lever and switch. In the preferred embodiment, the oven assembly is weighted so that the forward combination manual rotation lever rests about 30° forward. The forward combination manual rotation lever and switch and oven assembly can further barrel-pivot or drum-pivot forward to release the hot tortillas.

The steps for using the improved tortilla toaster are as follows:

1. At its resting position, the forward combination manual rotation lever and switch will rest about 30° lower than the rearward combination manual rotation lever and switch;
2. The user will load the desired number of slots in the improved tortilla toaster with one or more tortillas (a user could elect to load tortillas after the unit has reached operating temperature without compromising effectiveness of the toasting operation);
3. The user will barrel-roll the forward combination manual rotation lever and switch and rearward combination manual rotation lever and switch until they are approximately parallel to one another thereby turning on the improved tortilla toaster;
4. The improved tortilla toaster will heat the tortillas in the heater for the time set on the adjustment knob;
5. At the end of the cycle, the oven enclosure assembly will rotate forward to to rest position;

6. The user may further rotate the oven enclosure assembly until the hot tortillas slide from the improved tortilla toaster;
7. When the user releases the forward and rearward combination manual rotation lever and switch, then the barrel will pivot back to the near parallel position where the oven enclosure assembly rests;
8. Repeat with one or more additional tortillas.

OBJECTS OF THE INVENTION

The objects of this improved tortilla toaster invention include but are not limited to:

To provide for tabletop or reasonable equivalent heating of multiple tortillas simultaneously;

To provide for rapid risk-free emptying of the improved tortilla toaster that takes advantage of the tortilla shape and gravity;

To provide for simultaneous heating on both sides of the a tortilla;

To provide even heating of tortillas; and,

To provide heating of tortillas without the risk of electrocution.

DESCRIPTION OF THE PREFERRED EMBODIMENT

The preferred embodiment of the improved tortilla toaster is shown in the accompanying figures. Essentially, the improved tortilla toaster provides for heating up to six tortillas at one time. Rather than heat the tortilla on one side at a time as a user would in a skillet, the improved tortilla toaster provides for toasting and heating of two sides at one time. Unlike a bread toaster that uses an exposed wire heater to toast, the improved tortilla toaster uses mica thermal diffusers to even out heat and spread the heat to optimize toasting and heating a tortilla. Moreover, the improved tortilla toaster is engineered to operate off of a standard 15 Amperes line available in most homes in the United States.

Method of Operation

The improved tortilla toaster operates off of both temperature and time to achieve optimal doneness. The heart of the control circuit is an 8-bit microcontroller PIC 18F13K22 (in FIG. 8 called 'NUNI CONTROLLER') which is configured as follows:
1. Insert tortillas in the improved tortilla toaster
2. Rock the housing backward to activate the heating cycle
3. When toasting is complete, the heating process stops and the toaster housing is released forward slightly to its original position
4. Rotate the toaster housing to present the tortillas for retrieval.

The controller is predicated on both the toasting temperature, and, once the temperature is reached, the user can select time (what a user might term "done-ness") by adjusting the adjustment knob. Neither time nor temperature alone are suitable to achieve consistent tortilla toasting. The block diagram is included as FIG. 8.

When the user closes the switch contacts (by rotating the outer oven enclosure so that the cage guards are up), the heating modules are connected to the AC as well as the microcontroller which turns on the electromagnet that holds the outer oven enclosure in place in the parallel to the surface position described earlier. The microcontroller signals to the user that the tortilla toaster is heating by blinking an LED just adjacent the knob.

The user may exercise a personal preference loading the tortillas in the tortilla toaster before starting the heating cycle or after the tortilla toaster has come to temperature without a loss in efficiency or effectiveness.

The control circuit's temperature measurement element (a Negative Temperature Coefficient Thermistor) is mounted in the inner oven to measure the oven temperature. In the Thermistor, the resistance changes in response to the temperature in the toaster with its resistance dropping to a well characterized resistance vs. temperature curve as the temperature rises.

The microcontroller selected for the tortilla toaster includes A to D (Analog to Digital) converter that's built into the microcontroller. The A to D converter allows the microcontroller to convert a small voltage (analog) produced by the Thermistor into a binary number (digital). The voltage the Thermistor produces is proportional to the temperature inside the tortilla toaster. Hence, the number that the A to D converter obtains by measuring the voltage produced by the Thermistor is a numeric representation of the tortilla toaster's internal temperature. This number is used by the microcontroller's logic to determine the readiness of the tortilla toaster to start the toasting cycle. The microcontroller samples the tortilla toaster's internal temperature nearly continuously. During this heating phase, the tortilla toaster indicates that it is coming to toasting temperature but not yet there by blinking an LED adjacent to the adjustment knob. However, if the Inner Oven Enclosure is already at toasting temperature, the microcontroller will skip the coming to toasting temperature phase. Since the microcontroller continuously monitors the internal temperature of the Inner Oven Enclosure, the microcontroller will know if it can transition into the toasting cycle without a heating delay.

Once the microcontroller determines that the critical toasting temperature is reached (through experimentation inventor determined a starting or "factory-set" value of about 50° C. (about 122° F.)) the logic tells the program that the Inner Oven Enclosure is officially "HOT" and the toasting timing or duration, set by the knob mounted on the front of the Outer Oven Enclosure, begins and this is signaled by the LED illuminating continuously instead of blinking.

The toasting duration is selected via the rotary code switch which has 16 separate positions. A switch with fewer positions could be used. The position of the switch is communicated to the microcontroller via 4 lines. The toasting duration (timing) is adjustable from a range that goes from 15-seconds to 90-seconds, per the below table.

| Sw Position | Duration Sec |
| --- | --- |
| 1 | 15 |
| 2 | 20 |
| 3 | 25 |
| 4 | 30 |
| 5 | 35 |
| 6 | 40 |
| 7 | 45 |
| 8 | 50 |
| 9 | 55 |
| 10 | 60 |
| 11 | 65 |
| 12 | 70 |
| 13 | 75 |
| 14 | 80 |

-continued

| Sw Position | Duration Sec |
|---|---|
| 15 | 85 |
| 16 | 90 |

The bold cells show the variability if a 10-position switch were used.

Once the timer is decremented to zero, the logic turns off the electromagnet that hold the DPST Switch Contacts closed and the heating modules are therefore extinguished. As a result of the loss of holding force, the Inner Oven Enclosure and Outer Oven Enclosures should rotate to its resting position (about 30° forward) simply due to where the concentration of mass is located on the Inner Oven Enclosure and Outer Oven Enclosure. The "Time and Temperature" based approach will produce consistent batch-to-batch tortilla toasting outcomes.

Optionally, inventor, due to a surplus of drive pins on the microcontroller, might include a beeper alarm for the end of the toasting cycle but the alarm can be left out without undermining operation of the microcontroller.

Aside from the microcontroller, the components include a thermistor for measuring temperature in the Inner Oven Enclosure, a rotary code switch for selecting toasting duration, a transistor-like semi-conductor for energizing the electromagnet, an LED to indicate state of the device, and, optimally, a beeper, and an AC power supply.

This control board connects to the AC line via the DPST Switch contacts that are part of the rotating mechanism, so the controller board itself does not carry the heavy load of the heaters. The heaters are connected in parallel to the DPST Switch contacts. There is one DPST Contact Assembly that sits in the Right-Hand end cap which connects to the line-cord and there is a second, opposing DPST Contact Assembly that is carried on the rotating oven assembly that connects to the heaters and to the control board. When the DPST contacts are open (not in contact) then the tortilla toaster is not toasting. When the DPST contacts are closed, then the tortilla toaster is toasting. The only connection that the controller board makes (aside from connecting to the AC line) is to the electromagnet which holds the DPST Switch contacts closed during the toasting cycle. So the DPST Switch Contacts carry the complete load of the heaters and completely disconnects the toaster from the AC power when toasting is complete without even the controller connected to the AC line so that the tortilla toaster draws no electricity when it is not on.

The following sections more precisely disclose assembly and operation of the improved tortilla toaster.

BRIEF DESCRIPTION OF THE DRAWINGS

FIG. 5 is an exploded isometric view of the heating module for the improved tortilla toaster.
FIG. 6 is a right side view of the improved tortilla toaster.
FIG. 7a is a cut away view taken along the 7a-7a line of FIG. 3 of the improved tortilla toaster.

FIG. 10a is a round oven with a tortilla sticking out of it. FIG. 10b is the "D" shaped oven with a tortilla sticking out of it. FIG. 10c is a square oven with a tortilla sticking out of it.

FIG. 11 shows steps for heating and toasting a tortilla with the improved tortilla toaster. FIG. 11a shows a tortilla being placed in the top of the improved tortilla toaster at its rest position where the rear combination manual rotation lever and switch is higher than the forward combination manual rotation lever and switch. FIG. 11b shows the improved tortilla toaster with the oven turned into its operating mode by placing the forward and rearward combination manual rotation lever and switch of the heater as approximately parallel to the table top (allowing the unit to heat up to toasting temperature) where the bent tab comes in contact with the electromagnet. FIG. 11c shows how the improved tortilla toaster returns to its rest position with the rearward combination manual rotation lever and switch higher than the forward combination manual rotation lever and switch when the timer runs its cycle when the electromagnet releases. FIG. 11d shows the oven assembly barrel or drum rotated forward so that the tortillas slide out of the improved tortilla toaster.

DETAILED DESCRIPTION OF THE DRAWINGS

Figure 1:
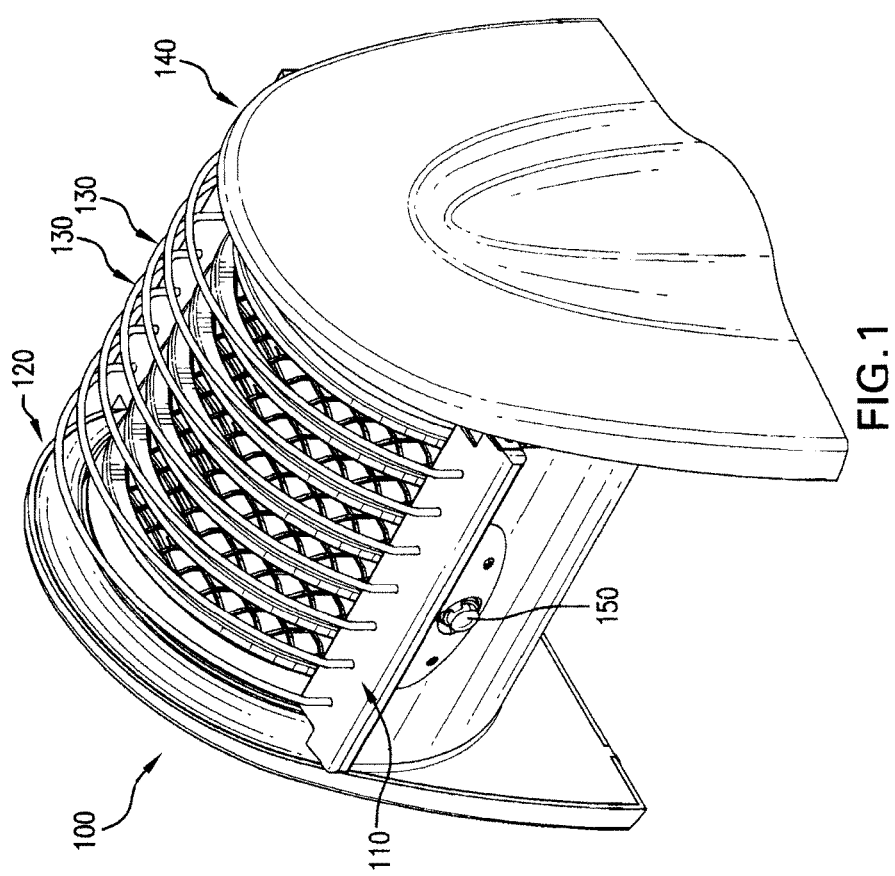
FIG. 1 a perspective view of the improved tortilla toaster.
Figure 2:
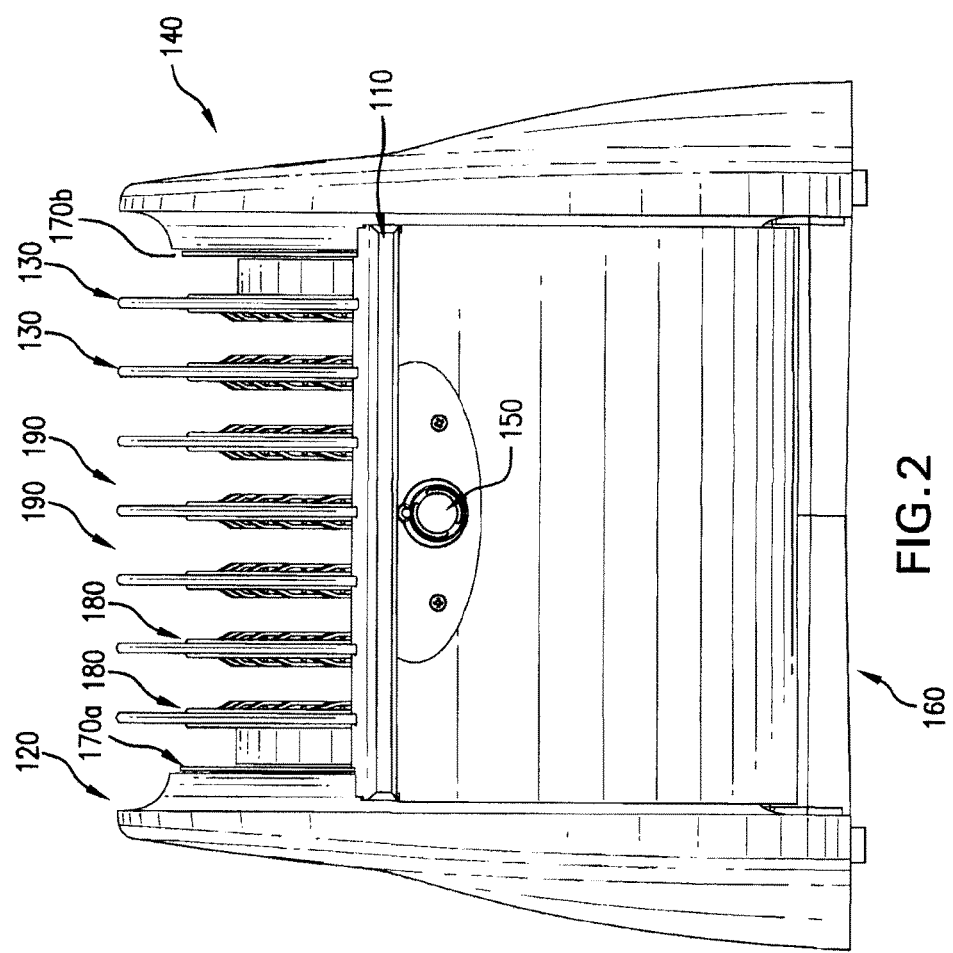
FIG. 2 is a front elevation of the improved tortilla toaster.
Figure 3:
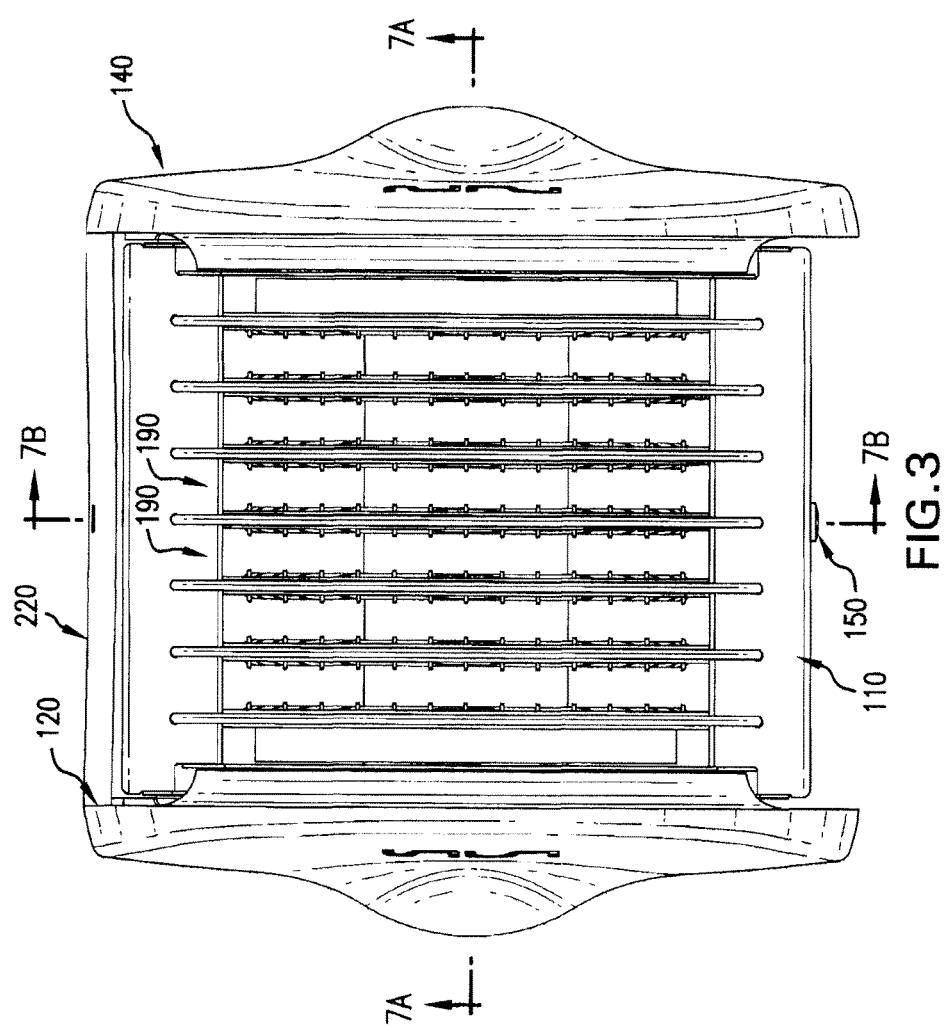
FIG. 3 is top plan view of the improved tortilla toaster.
Figure 7B:
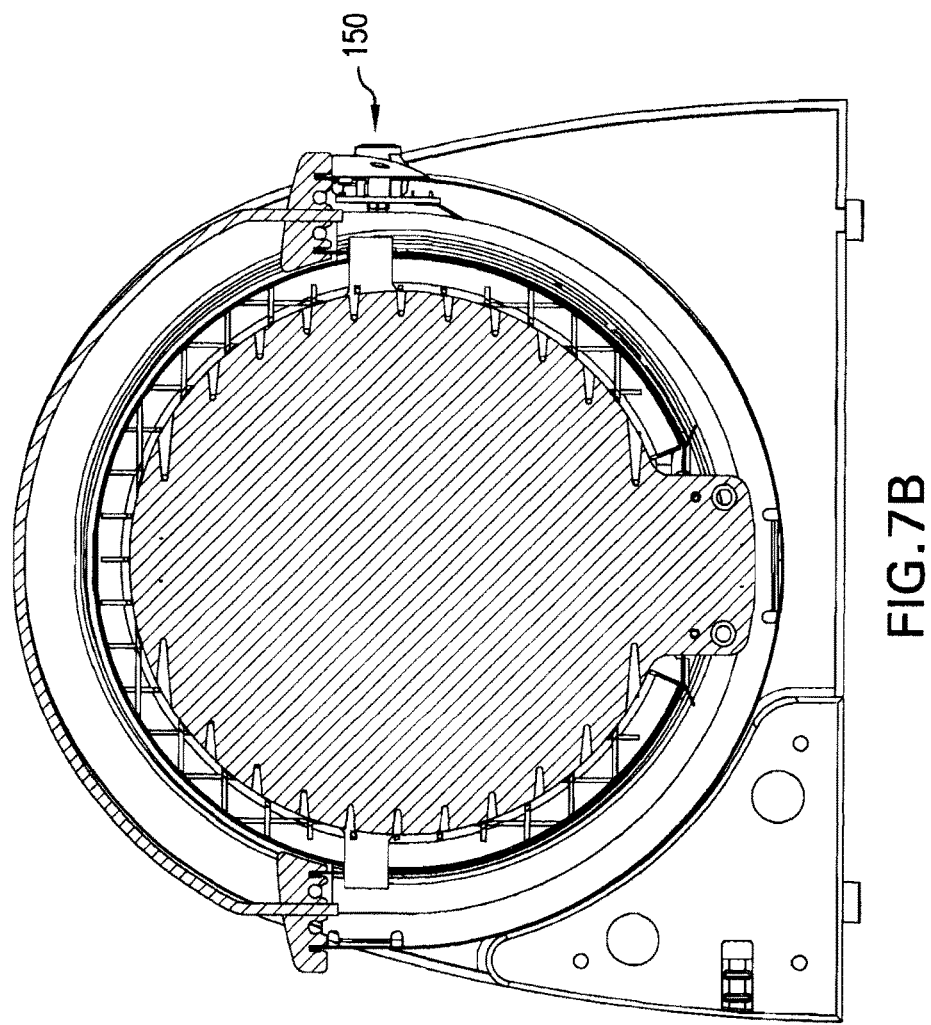
FIG. 7b is a cut away view taken along the 7b-7b line of FIG. 3 of the improved tortilla toaster.
Figure 8:
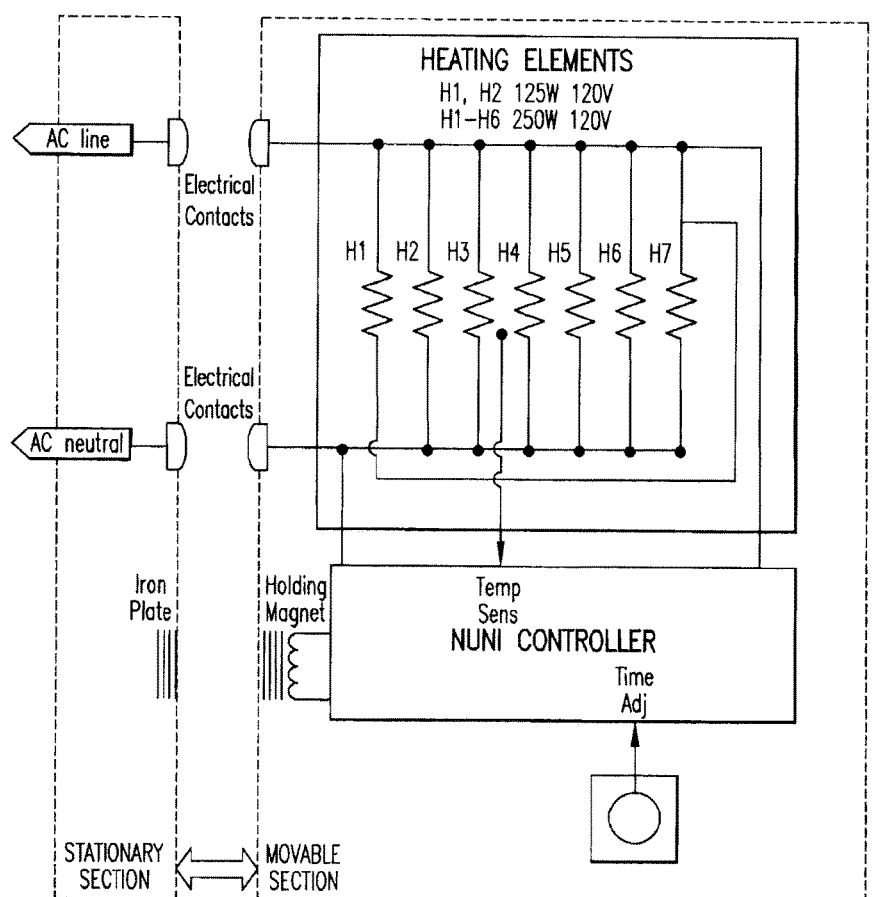
FIG. 8 is a block diagram that depicts how the moveable section is manually brought into contact with the stationary section by user showing contacts are closed and an electromagnet activates and controller first sets threshold temperature against factory-set value and then tests toasting time against user-set values by the knob. When both the threshold temperature equals the factory set value and the toaster time equals the user-set values are "True" then the controller releases the electromagnet and the disconnects the AC power.
Figure 17:
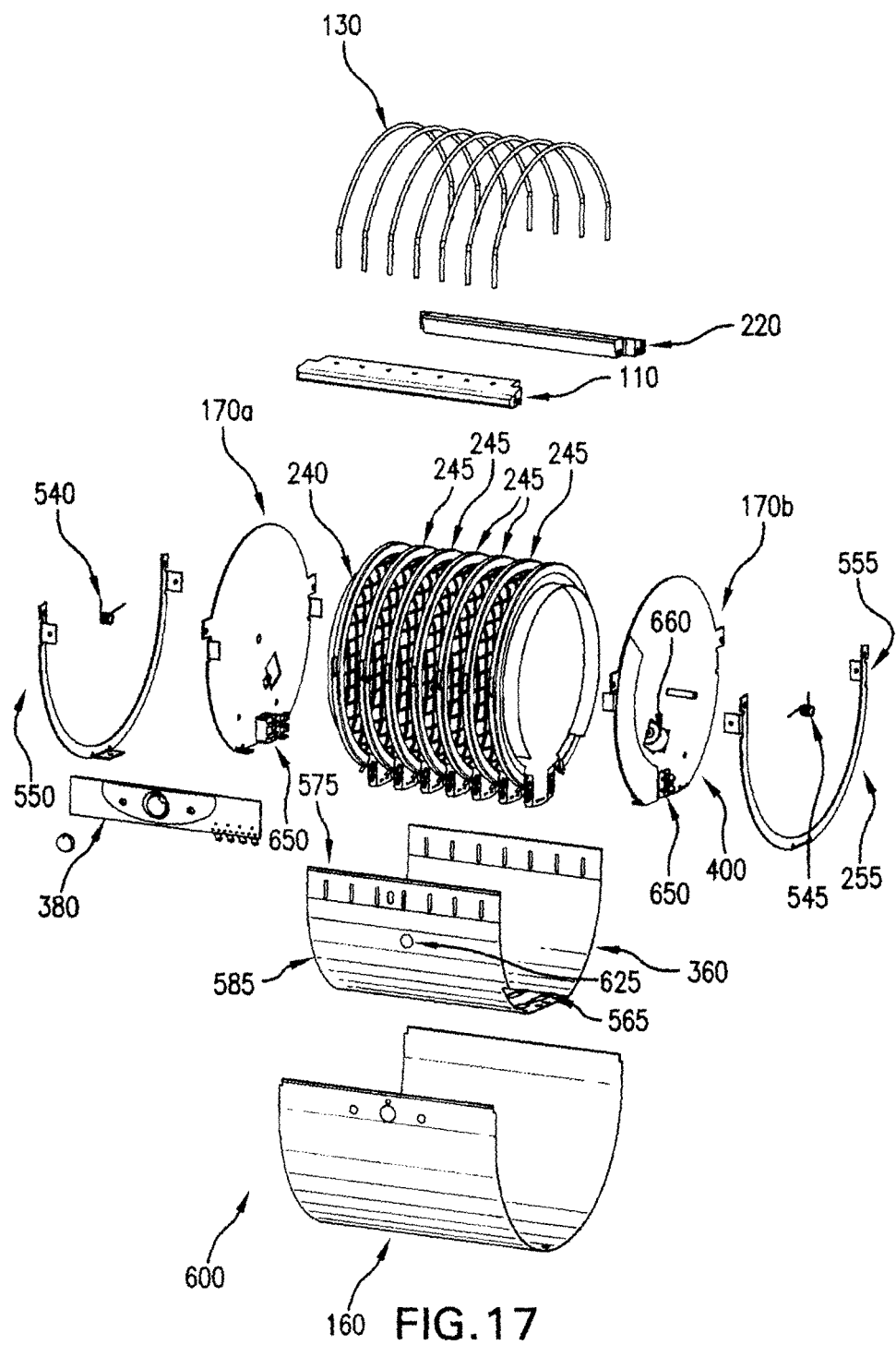
FIG. 17 is an exploded view of the outer oven, inner oven, heating modules, thermal brakes, forward combination manual rotation lever and switch, rearward combination manual rotation lever and switch, and finger guards of the improved tortilla toaster.
Figure 18:
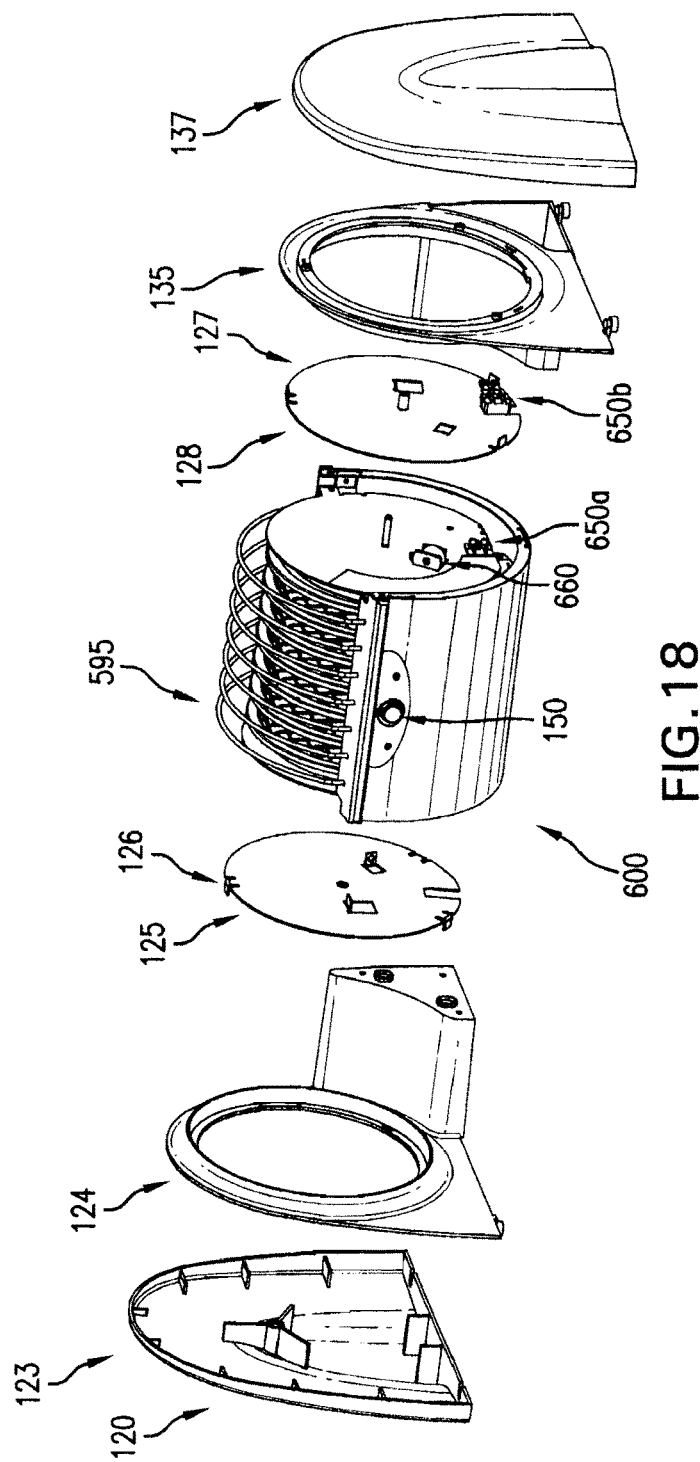
FIG. 18 is an exploded view of the improved tortilla toaster comprised of the left exterior end cap, the left interior end cap, left outer oven enclosure plate, the left thermal brake, the oven assembly with its heating modules in place, right outer oven enclosure plate, the right thermal brake, the right interior end cap, and the right exterior end cap.

The improved tortilla toaster 100, as shown in FIG. 1, is comprised of a left end cap unit 120 and a right end cap unit 140 which are formed with a flat bottom edge for resting on a flat surface such as a tabletop. As shown in FIG. 18, the left end cap is comprised of three pieces: left outer end cap 123, left inner end cap 124 and a left outer oven enclosure plate 125. Left outer end cap 123 and left inner end cap 124 are joined with molded clips or other attachment means. The left outer oven enclosure plate 125 fits in a recess in left inner end cap 124. The left outer enclosure plate 125 has a plurality of tabs 126. The left outer enclosure plate 125 has a hole in the approximate center of said plate. As shown in FIG. 2, FIG. 7a, and FIG. 17, the oven is comprised of left and right thermal brakes 170a, 170b which to which are secured with securing means a left pivot rod 350 and a right pivot rod 355 and an oven assembly 600. As shown in FIG. 7a, left inside end cap 120 has a left socket 530. The left pivot rod 350 is seated through said left outer enclosure plate 125 and into left socket 530. As shown in FIG. 18, the right outer enclosure plate 127 fits in a recess in right inner end cap 135. The right outer enclosure plate 127 has a plurality of tabs 128. The right outer enclosure plate 127 has a hole in the approximate center of said plate. As shown in FIG. 7a, right end cap unit 140 has a right socket 535. The right pivot rod 355 is seated through said hole in said right outer enclosure plate 127 and into right socket 535. On both the left side and right side, the outer enclosure plates 125 and 127 have holes large enough to allow the left and right pivot rods 350, 355 to protrude through the plates without binding on them.

As shown in FIG. 17, the oven 600 is comprised of two barrel-like or drum-like structures, an outer oven enclosure 160 and an inner oven enclosure 360. The inner oven enclosure 360 nests within the outer oven enclosure 160. The outer oven enclosure 160 on the left side is secured to bracket 550 with rivets or other securing means. The left side of outer oven enclosure 160 with bracket 550 is secured to left outer oven enclosure plate 125 using a plurality of tabs 126. The outer oven enclosure 160 on the right side is secured to bracket 555 with rivets or other securing means. The right side of the outer oven enclosure 160 with bracket 555 is secured to the right outer enclosure plate 127 using a plurality of tabs 128.

Figure 4:
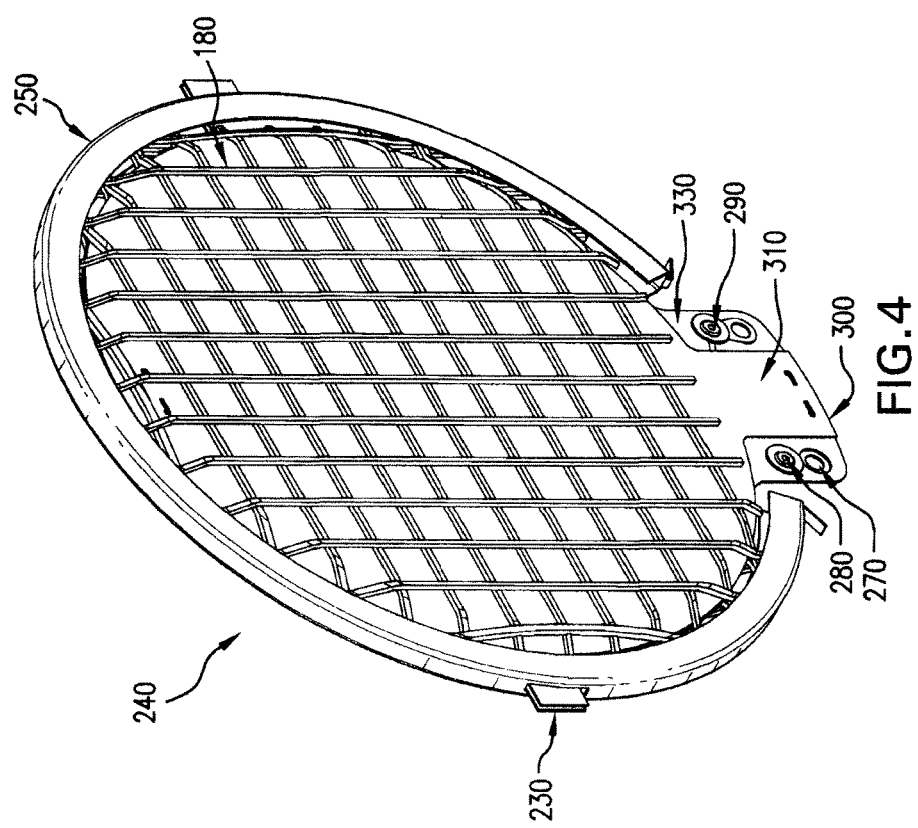
FIG. 4 is a perspective of the heating module assembled for the improved tortilla toaster.
Figure 13:
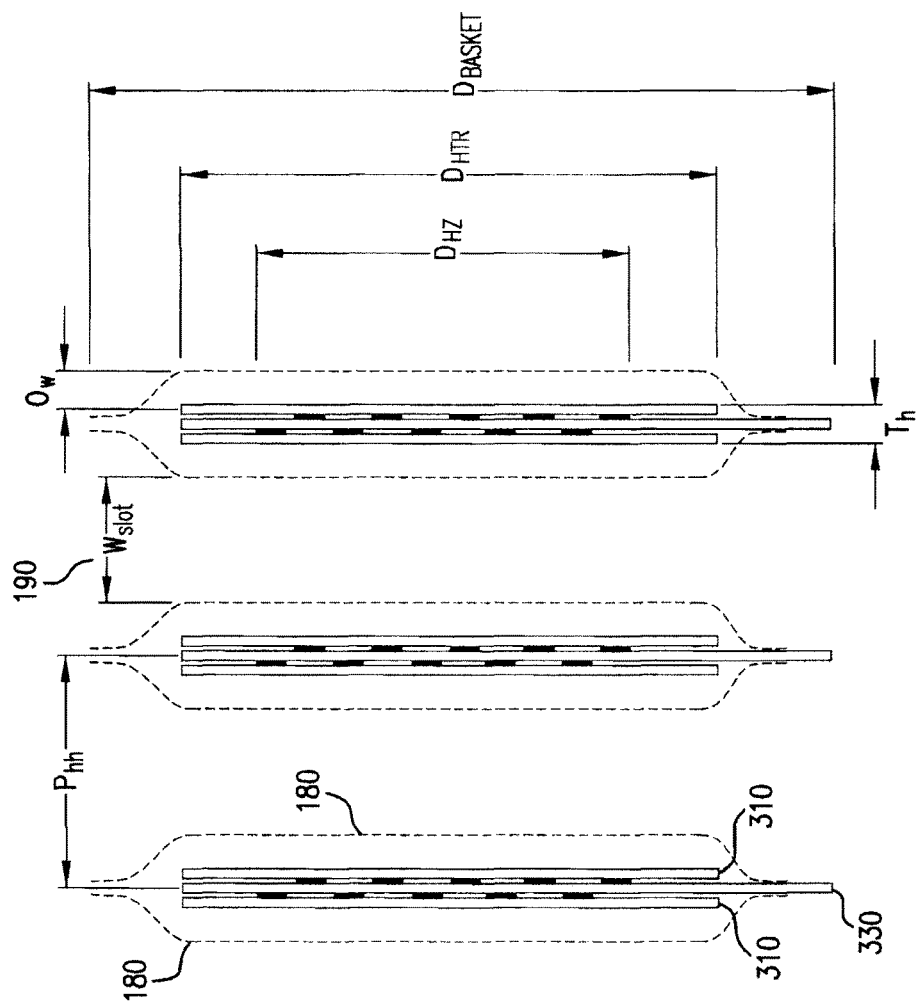
FIG. 13 is a schematic that shows the various sizes and spacing of the components and sub-components that comprise the heating modules.
Figure 14:
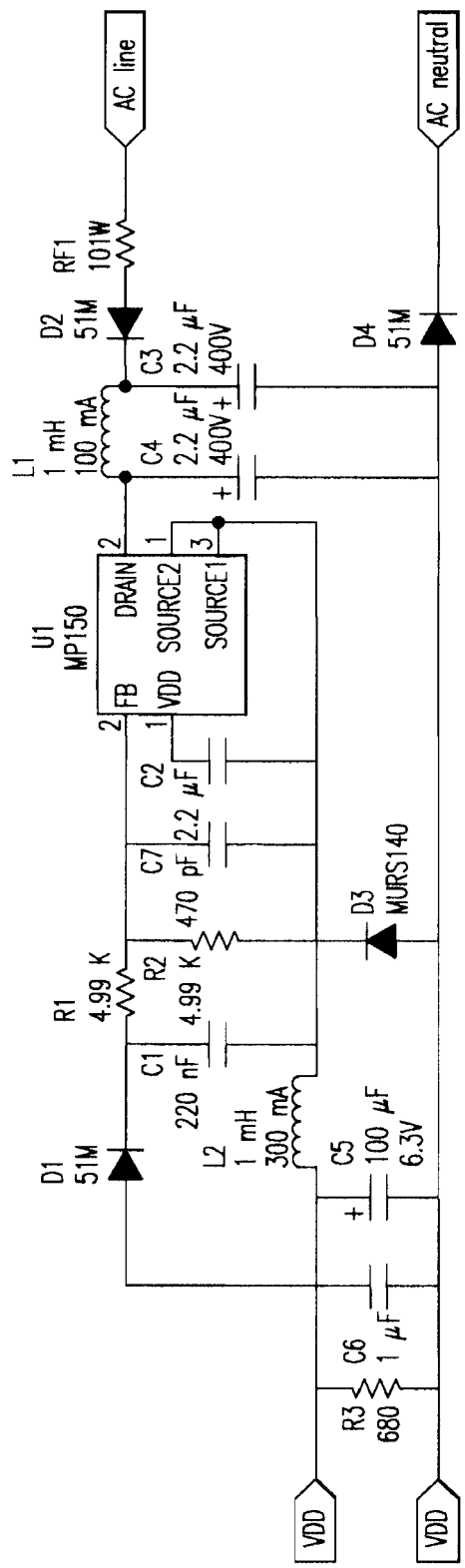
FIG. 14 is the +5V Power Supply for the improved tortilla toaster.
Figure 15:
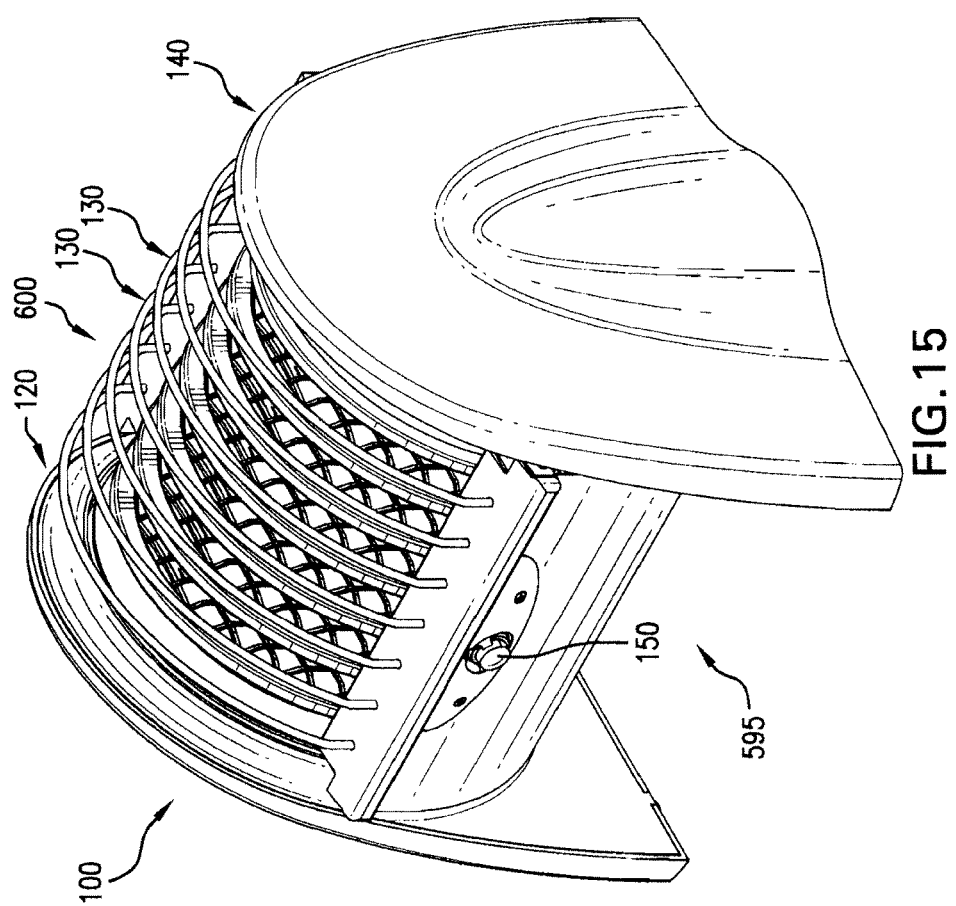
FIG. 15 is a perspective rendering of the improved tortilla toaster.
Figure 16:
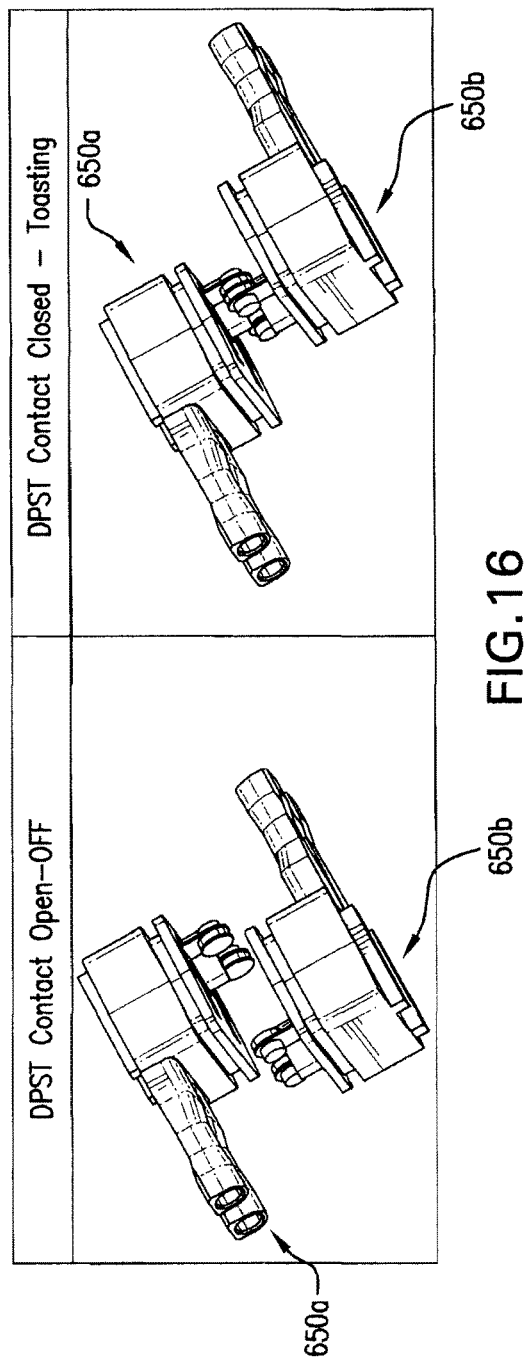
FIG. 16 is a rendering of DPST Contacts in closed and open positions of the improved tortilla toaster.

At the heart of the improved tortilla toaster are heating modules as shown assembled in FIG. 4 and in exploded view in FIG. 5. FIG. 13 provides information on dimensions within the heating module. FIG. 7a shows the seven heating modules in the preferred embodiment of the invention. As you will read below, there are one-sided and two-sided heating modules. Of the seven heating modules, the first and seventh heating modules are one-sided heating modules since outer heating modules only have potential contact with a tortilla on one side. Heating modules in the middle five positions have potential contact with a tortilla on both sides of the modules.

A two-sided heating module 245, as shown in FIG. 5, is comprised of a left side cage guard 180, a first mica thermal diffuser 310, a mica board 330 wrapped with Nichrome ribbons 320, a second mica thermal diffuser 310, a right side cage guard 180 and the entire heating module 245 is held together with assembly retainer 250. A one-sided heating module 240 is the same as a two-sided heating module 245 except that the Nichrome ribbons are only present on one side of the mica board 330. The paddle-shaped mica board 330 is notched with a plurality of notches 342. As shown in FIG. 4 and FIG. 5, mica board 330 has connection tab 300. Connection tab 300 has wire lay notches 270. Nichrome lead wire 290 feeds the Nichrome ribbons 320 that are wound around mica board 330 ending in wire lay notch 270 and wire loop Nichrome terminal 280. On either side of mica board 330 is mica thermal diffuser 310. The heating module of cage guard 180, mica thermal diffuser 310, mica board 330, mica thermal diffuser 310, cage guard 180 are held together with assembly retainer 250. As shown in FIGS. 7a and 17, the improved tortilla toaster makes use of five two-sided heating modules 245 and two one-sided heating modules 240.

The inner oven enclosure 360, as shown in FIG. 17, is fabricated with seven regularly spaced bottom slots 565 and seven regularly spaced forward and rearward side slots 575. The left side thermal brake 170a is secured with rivets or other securing means and bracket 550 to the left edge of the inner oven enclosure 360. As shown in FIGS. 7a and 17, a one-sided heating module 240 (active side facing to right side) is installed in the extreme left slot 565 such that connection tab 300 protrudes through the bottom of inner oven enclosure 360. Five two-sided heating modules 245 are installed in the center five bottom slots such that connection tab 300 protrudes through the bottom of inner oven enclosure 360. As shown in FIGS. 7a and 17, a one-sided heating module 240 (active side facing to left side) is installed in the extreme right slot 565 such that connection tab 300 protrudes through the bottom of inner oven enclosure 360. The right side thermal brake 170b is secured to with rivets or other securing means and bracket 555 to the right edge of the inner oven enclosure 360. As shown in FIGS. 7a and 17, an AC power cord comes from an electric source into the right end cap 137 and connects to the DPST Contact 650b mounted Right Plate 127. The DPST Contact 650a is mounted on the right thermal brake 170b. Wire leads run from the DPST Contact 650a to the one sided heating module 240 adjacent the right thermal brake 170b and connects at the wire lay notch 270. Another set of wire leads run from the wire lay notch 270 to the control board 380. The heating modules are powered with wires that run pier to pier from one heating module to the next connected at the wire lay notches 270 on each heating module 240, 245. Another set of wire leads run from the control board 380 to electromagnet 660 mounted on the thermal brake 170b.

As shown in FIG. 17, the inner oven assembly 585 is secured in the outer oven enclosure 160 using the left bracket 550 and right bracket 555. The retention tab 230 as shown in FIG. 4 on each assembly retainer 250 on each heating module 240, 245 is locked into place by the forward combination manual rotation lever and switch 110 which is secured to the brackets 550, 555 and front edge of outer oven enclosure 160 with securing means and the rearward combination manual rotation lever and switch 220 which is also secured to the brackets 550, 555 and the rear edge of the outer oven enclosure 160. Six finger guards 130 are secured in the forward combination manual rotation lever and switch 110 and rearward combination manual rotation lever and switch 220.

As shown in FIGS. 7, 17, and 18, the outer oven assembly 595 is mounted in the left end cap unit 120 and right end cap unit 140 by the left pivot rod 350 on the left thermal brake 170a nesting through the left outer oven enclosure plate 125 into the left socket 530 and the right pivot rod 355 on the right thermal brake 170b nesting through the right outer oven enclosure plate 127 into the right socket 535. Left and right torsion springs 540, 545 are installed on left and right pivot rods 530, 535 to control the rolling of the oven assembly 600.

The improved tortilla toaster, as shown in FIG. 13, is specifically configured. The thickness, $T_h$, of the two mica thermal diffusers 310 along with the mica heating plate 330 is about 0.0785 inches. By experimentation, the inventor determined that the optimal distance from the outside of each mica thermal diffuser 310 to the cage guard 180, $O_w$, is about 0.100 inch. By experimentation inventor determined that the loading zone 190 between two opposing cage guards 180, $W_{slot}$, is about 0.435 inch. The distance from heating center of one mica heating plate 330 to the adjacent center of mica heating plate (known as the "Pitch"), $P_{hh}$, is derived to be about 0.800 inch. The diameter of the hot zone, $D_{HZ}$, was established by experimentation to be about 5.5 inches. The diameter of the mica heater assembly, $D_{HTR}$, was established by experimentation to be about 6.0 inches. The diameter of the cage guard 180 (here called by the alternate name "wire cloth") was determined by experiment to be about 6.5 inches.

The controls in the improved tortilla toaster are shown in FIGS. 1, 2, 3, 7b, 8, 9a, 9b 14, 15, 17, and 18. FIGS. 1, 2, 3, 7b, 8, 14, 15, 17, and 18 show the adjustment knob 150 mounted on the front of the outer oven enclosure 160. The knob 150 connects through the outer oven enclosure and attaches to the control board 380. The control board 380 is mounted on the inside of the outer oven enclosure 160 although the knob 150 includes a LED indicator light above it. On the wire diagram FIG. 9b, the adjustment knob 150 connects to the Duration Rotary Switch on the control board 380. The Duration Rotary Switch has either 10 or 16 positions. The control board 380 is connected to a thermistor 625 that protrudes into or has access through an aperture to the inner oven 360 to measure the temperature in the inner oven 360.

Figure 9A:
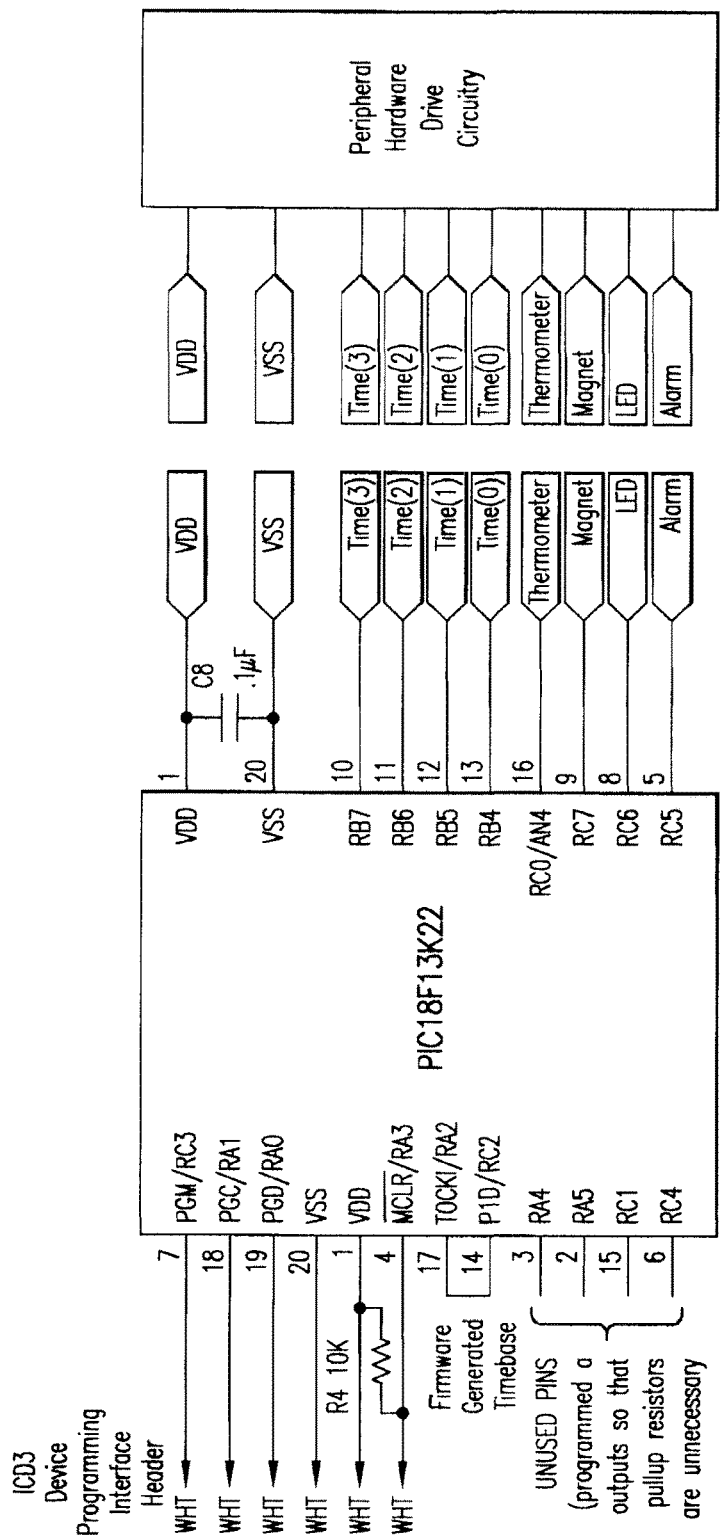
FIG. 9a is the toaster control electronics of the improved tortilla toaster.
Figure 9B:
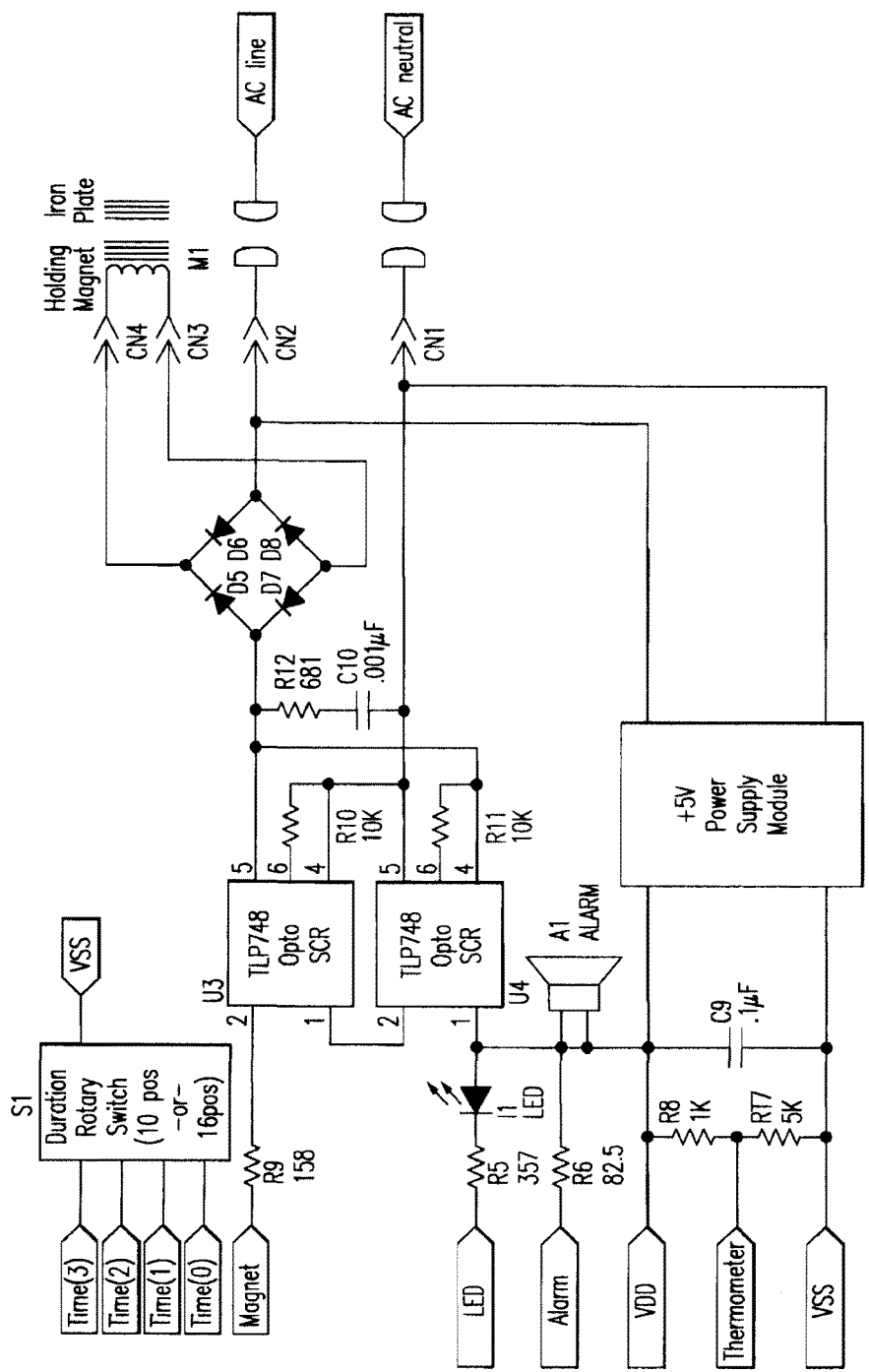
FIG. 9b is the peripheral hardware drive circuitry of the improved tortilla toaster.
Figure 10:
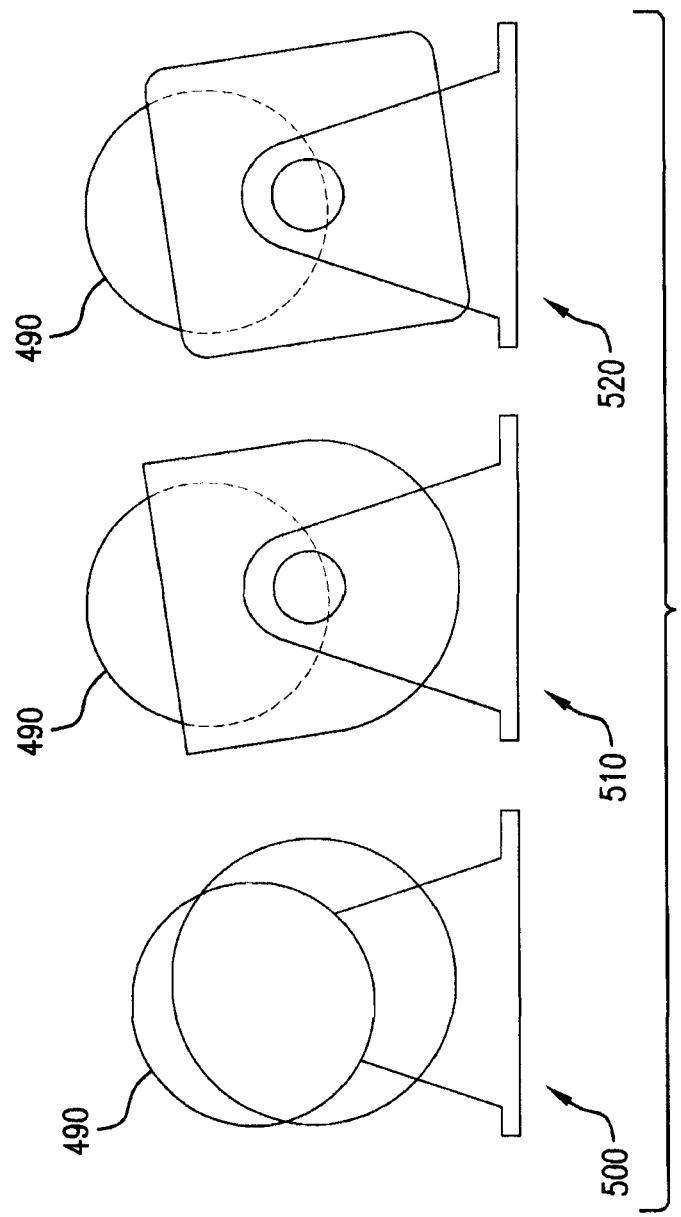
FIG. 10 shows three alternate embodiments for the shape of the outer oven of the improved tortilla toaster.
Figure 12B:
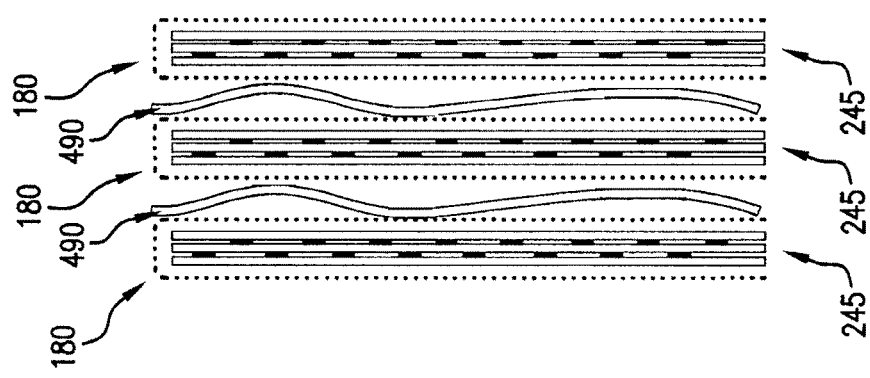
FIG. 12b shows the improved tortilla toaster with heating modules with cage guards specifically configured to hold a tortilla a specific distance from said heating modules as well as a mica heating plate with mica thermal diffusers on either said of said mica heating plate that spreads the heat so as evenly to heat and to toast a tortilla.
Figure 12A:
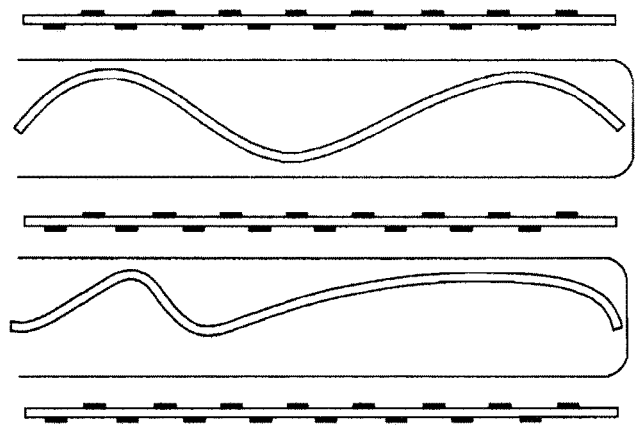
FIG. 12a shows the prior art heating of a tortilla in a typical bread toaster where there is a wire basket designed to hold a piece of bread with exposed heating elements on either side of the basket.

The improved tortilla toaster is turned on by rotating the forward combination manual rotation lever and switch 110 or the rearward combination manual rotation lever and switch 220 so that they are about parallel to the table top on the improved tortilla toaster is resting. That rotation brings into contact DPST contacts 650a and 650b (connecting the improved tortilla toaster to AC line power) and moves the bent tab 400 to a position in contact with electromagnet 660. Connected to AC line power, the microcontroller marked PIC18F13K22 on wire diagram FIG. 9a, starts the heating process of the heating modules 240, 245. The electromagnet 660 when energized and bent tab 400 keep the improved tortilla toaster in the operating position with the front combination manual rotation lever and switch 110 and rear combination manual rotation lever and switch 220 approximately parallel to the ground or surface on which the improved tortilla toaster. FIG. 9a is the toaster control electronics for the improved tortilla toaster. FIG. 9b is the circuitry diagram for the improved tortilla toaster. The power lead 370 connects to the control board 380.

FIG. 11 shows the steps of using the improved tortilla toaster. FIG. 11a shows the improved tortilla toaster in its resting position where the forward combination manual rotation lever and switch 110 is rotated a bit and down such that the rearward combination manual rotation lever and switch 220 is a bit up. At this point, the user would load tortillas in the improved tortilla toaster. FIG. 11b shows that by rotating the forward combination manual rotation lever and switch 110 or the rearward combination manual rotation lever or switch 220 so that they are parallel to the table top, the improved tortilla toaster engages and heats. FIG. 11c shows how at the end of the time cycle (when the electromagnet 660 releases the bent tab 400 and the oven assembly pivots forward and right and left pivot rods 350, 355 cause the oven assembly 600 to rotate to its rest position) releases the forward combination manual rotation lever and switch 110 and rearward combination manual rotation lever and switch 220 would once again return to a rest position. In FIG. 11d, the user may rotate the oven assembly by pressing down the forward combination manual rotation lever and switch 110 or by pulling over the rearward combination manual rotation lever and switch 220 for the heated tortillas to slide from the improved tortilla toaster. After removing the tortillas and with or without assistance from the user the oven assembly 600 would rotate back to its rest position (as shown in FIG. 11a) as it is weighted to have a resting position of approximately 30° forward.

This invention has been disclosed in terms of certain embodiments. It will be apparent that many modifications can be made to the disclosed apparatus without departing from the invention. Therefore, it is the intent of this application to cover all such variations and modifications as come within the true spirit and scope of this invention.

The invention claimed is:

1. A tortilla toasting device for batch heating up to six soft, flat, pliable, bendable tortillas simultaneously, comprised of:
   a. an upright support base;
   b. a substantially horizontally arranged drum rotatively secured on said support base;
   c. an oven assembly (600) comprised of heating modules (240,245) arranged vertically in said drum adapted to receive and to support and hold each of said soft flat tortillas;
      i. said heating modules (240,245) arranged transverse to the rotation of said drum;
      ii. heating modules (240,245) adapted to receive said soft flat tortillas in said oven assembly (600) for heating;
      iii. each of said heating modules (240, 245) arranged at a fixed distance from each other of said heating modules;
   d. an electromagnet affixed in said oven assembly to lock rotation of said drum during heating;
   e. said drum being selectively manually rotatable rotating from a first position to receive said tortillas in said heating modules to a second position where said electromagnet locks rotation of said oven assembly during heating thereafter rotating to a third position where said tortillas fall from heating modules.

2. The device recited in claim 1, wherein said support base comprises a pair of spaced apart end caps, one on each end of said drum.

3. The device recited in claim 1, wherein said drum contains an inner oven assembly for receiving said heating modules.

4. The device recited in claim 3, wherein said drum has lever means for controlling the movement of said drum.

5. The device recited in claim 3, wherein said drum has switch means for controlling delivery of heat to said heating module.

6. The device recited in claim 1, wherein each said heating module (240,245) comprised of
   a mica heating plate (330) wound with heating resistance wires (320)
   at least one thermal diffuser on at least one side of said heating plate and
   a right and a left side spacing support (180) to support said tortilla while warming said tortilla.

7. The device recited in claim 6, wherein said heating modules (240,245) have said thermal diffusers arranged to heat about both sides of said tortillas.

8. The device recited in claim 7, wherein said heating modules and said thermal diffusers about evenly heating said tortilla across surface of said tortilla.

9. The device recited in claim 7, wherein said thermal diffusers are comprised of mica.

10. The device recited in claim 7, wherein said heating elements comprise electrical resistance wires.

11. The device recited in claim 6, wherein adjacent cage guards support the each side of each said tortilla while each said tortilla is warmed.

12. The device recited in claim 6, wherein a guard is provided adjacent to each said heating module (240,245).

13. The device recited in claim 6, wherein an electrical circuit in said device connects said heating modules (240, 245) to a source of power.

14. The device recited in claim 13, wherein a timer in said electrical circuit establishes a cycle for delivering electrical power to said heating modules (240,245).

15. The device recited in claim 14, where said timer controls release of said drum to rotate from an operating mode position to said a rest position.

16. The device recited in claim 14, wherein said timer is started by user rotating said drum from a first rest position up to a second operating position.

17. The device recited in claim 13, wherein said electrical circuit has a control board connected to said heating modules, said control board providing for bringing said heating modules to heating temperature and maintaining said temperature to achieve a selected "done-ness" for a tortilla and then shutting down.

18. The device recited in claim 1, wherein said tortilla is held in said first position when received in said drum and said tortilla falls freely from said drum when said drum is rotated forward from its resting position.

19. The device recited in claim 13, wherein a timer in said electrical circuit establishes a cycle for delivering electrical power to said electromagnet.

20. The device recited in claim 1, wherein said heating modules and said electromagnet and a microcontroller are powered when said drum is rotated such that a first DPST contact and a second DPST contact are in communication and the device and, upon the completion of the cooking sequence by said microcontroller, said microcontroller terminates power to said electromagnet allowing said drum to rotate to said first position thereby separating said first DPST contact and second DPST contact.

21. The device recited in claim 6, wherein the distance between adjacent mica heating plates is 0.8 inch.

22. The device recited in claim 1, where in the oven assembly during heating maintains a temperature of 120 degrees Fahrenheit.

* * * * *